(No Model.)
D. L. SPICHER.
FEED TROUGH.
No. 378,942. Patented Mar. 6, 1888.
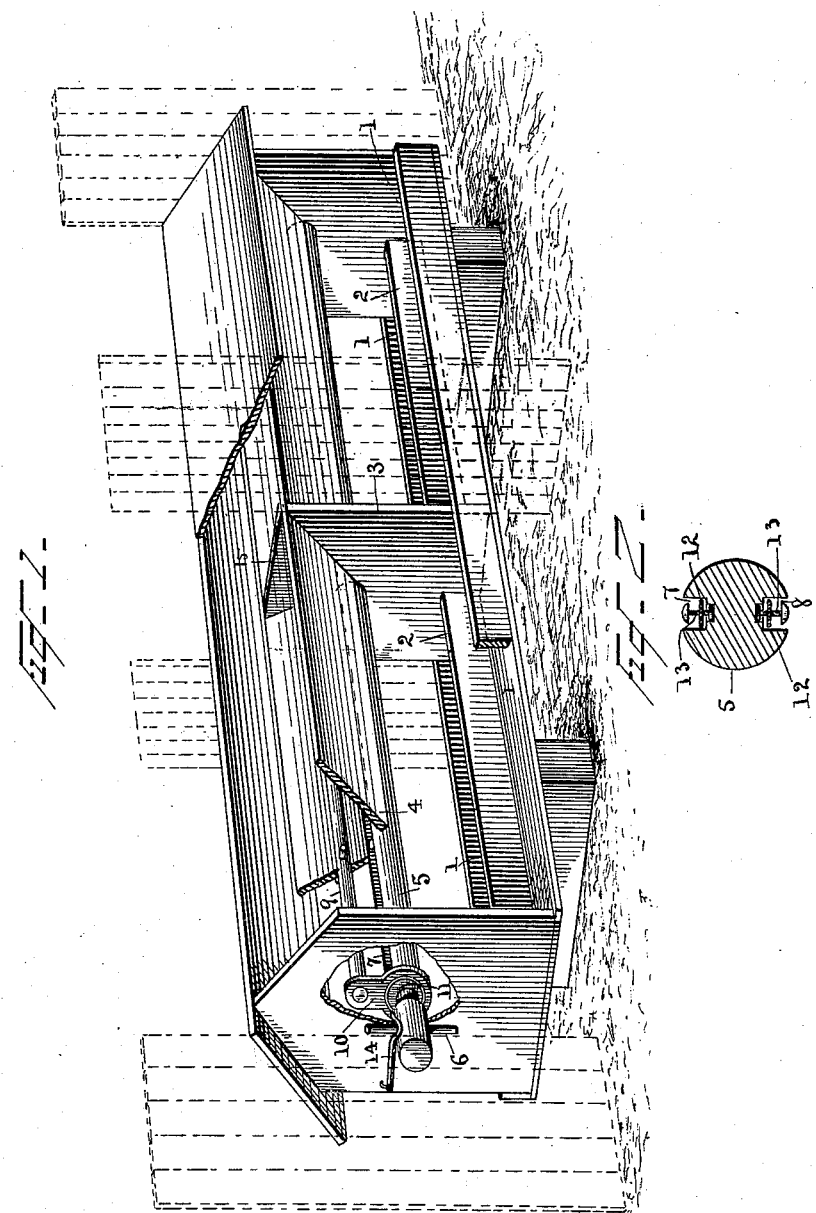
WITNESSES.
Torvin A. Clark.
J. W. Simpson.
INVENTOR.
Daniel L. Spicher.
By Benj. R. Catlin

UNITED STATES PATENT OFFICE.

DANIEL L. SPICHER, OF WABASH, INDIANA.

FEED-TROUGH.

SPECIFICATION forming part of Letters Patent No. 378,942, dated March 6, 1888.

Application filed October 18, 1887. Serial No. 252,688. (No model.)

*To all whom it may concern:*

Be it known that I, DANIEL L. SPICHER, a citizen of the United States, residing at Wabash, in the county of Wabash and State of Indiana, have invented certain new and useful Improvements in Feed-Troughs; and I do hereby declare the following to be a full, clear, and exact description of the invention, such as will enable others skilled in the art to which it appertains to make and use the same.

The invention relates to devices for feeding sheep, calves, colts, cattle, or other stock, and more particularly to feeding-troughs combined with grain-hoppers and with means for discharging grain or other food from the latter into the troughs; and it has for its object to provide means for feeding a measured and regulable quantity, and for feeding different quantities in different parts of a trough, and for stirring the grain or other food in the hopper; and it consists in the construction hereinafter described, and particularly pointed out.

In the accompanying drawings, which form part of this specification, Figure 1 is an isometric view of my invention, and Fig. 2 represents a transverse section of a feeding-cylinder provided with grain-receptacles on opposite sides.

A feeding-trough having four compartments is indicated at 1, said trough being divided longitudinally by the partition 2 and transversely by a partition, 3. Two or more of these transverse partitions may be employed, if desired. This trough is supported at a suitable height in any usual manner, and may be placed in the division-fence between two or more pens or fields, so that one or more portions of the trough will be accessible from particular inclosures. Thus if said fences cross the trough in the line of partitions 2 and 3, as indicated in dotted lines, each compartment will be alone accessible from a single pen or field.

Above the trough is a hopper, 4, which is preferably provided with inclined side walls, as represented, and can be made of size sufficient to hold food sufficient for one or for several days, as found desirable. An open space is provided between the lower edges of these sides, in which is accurately fitted a feeding-cylinder, 5, which is journaled in the end walls of the combined trough and hopper in such manner as to be capable of being rotated by the extension of the cylinder, which may be provided with a lever, 6, for this purpose, and with a locking device, 14, to prevent accidental movement of the cylinder. In one or more sides of said cylinder a receptacle for grain is provided. In the illustration two oppositely-placed receptacles, 7 and 8, are shown. Parallel with this cylinder is arranged a stirring device, 9, which is provided with downward extensions 10 10, that are made to embrace eccentrics or cams 11 11 on the cylinder just within the ends of the hopper. This stirrer may be provided with fingers, as indicated, for more effectually agitating the grain.

In the above-described grain-receptacle formed in the feeding-cylinder an adjustable bottom, 12, is arranged with screw-threaded openings, through which pass screws 13, which are fixed at their foot so as to revolve in sockets without longitudinal movement of the screw, whereby, when the screw is revolved, the adjustable bottom is raised or lowered to vary the capacity of the receptacle. When desired, separate adjustable bottoms may be provided for each grain-receptacle, or for distinct parts thereof.

The hopper can be provided with a hinged cover and with means for locking the same, and said cover may be sufficiently extended to shelter the animal feeding from sun and rain, in which latter case a door or lid may be provided in the cover, to afford access to the hopper for supplying grain.

In operation grain or other food of similar character is placed in the hopper, and a certain portion of it fills the receptacle in the cylinder. Upon revolving said cylinder half around the receptacle is emptied into the trough at one side of the partition 2. In case a second receptacle has been provided on the opposite side of the cylinder it will be brought on the upper side by the above-described movement and will become filled with grain, whereupon, by a reverse movement of the cylinder, its contents are discharged into the trough on the opposite side of the partition. By means of the adjustable bottoms the capacity of the receptacles can be varied at pleasure, so that from a hopper containing a supply for one or more days' use a definite quantity can be fed at each movement of the cylinder; or in case stock in different pens is fed at the same time the capacity of each division of the receptacles may be independently varied as desired, and according to the numbers, age, and character of stock in the several pens.

The turning of the feeding-cylinder raises and lowers the stirring device with the effect to prevent the packing or arching of the grain, and in some cases tends to obviate the injurious accumulation of heat from the fermentation of grain or its injury by mold.

In case it is desired to feed grain of different kinds to different kinds of stock at the same time and operation, partition or partitions 15 are employed, in which case distinct kinds of grain can be put in each hopper and fed accordingly.

It is of course obvious that either or both fences may be omitted, according to the purposes to which the trough is to be put or to the kind or kinds of stock to be fed. It is further obvious that if small stock is fed at one part of the trough and large at another suitable platforms can be provided, in usual manner, to sustain the animals in convenient position for feeding.

As an illustration of the capacity of the apparatus, it may be said that if it is used to feed sheep or other stock in fattening a quantity of grain can be placed in the hopper sufficient for several days' use, and by the aid of the adjustable bottom the amount fed at each operation can be varied according to the appetite and digestion of the animals, so that a sufficient amount may be given them without waste and without impairing their appetite.

Having thus described my invention, what I desire to claim and secure by Letters Patent is—

1. The feeding apparatus consisting of the trough, the hopper, the cylinder provided with a grain-receptacle and journaled to revolve in the space between the lower edges of the sides of the hopper and provided with eccentrics 11, and the stirring device provided with extensions 10, substantially as specified.

2. The feeding apparatus consisting of a trough provided with a longitudinal and transverse partition, a hopper provided with a transverse partition, and a cylinder provided with two grain-receptacles and journaled to revolve in the space between the lower edges of the sides of the hopper, and the stirring device, whereby it is adapted to separately feed different kinds of grain to different animals and in different quantities, substantially as specified.

In testimony whereof I affix my signature in presence of two witnesses.

DANIEL L. SPICHER.

Witnesses:
OLIVER H. BOGUE,
WILLIAM W. BENT.